May 14, 1940.  S. B. ATWOOD  2,200,252
HINGE
Filed July 30, 1937  2 Sheets-Sheet 1
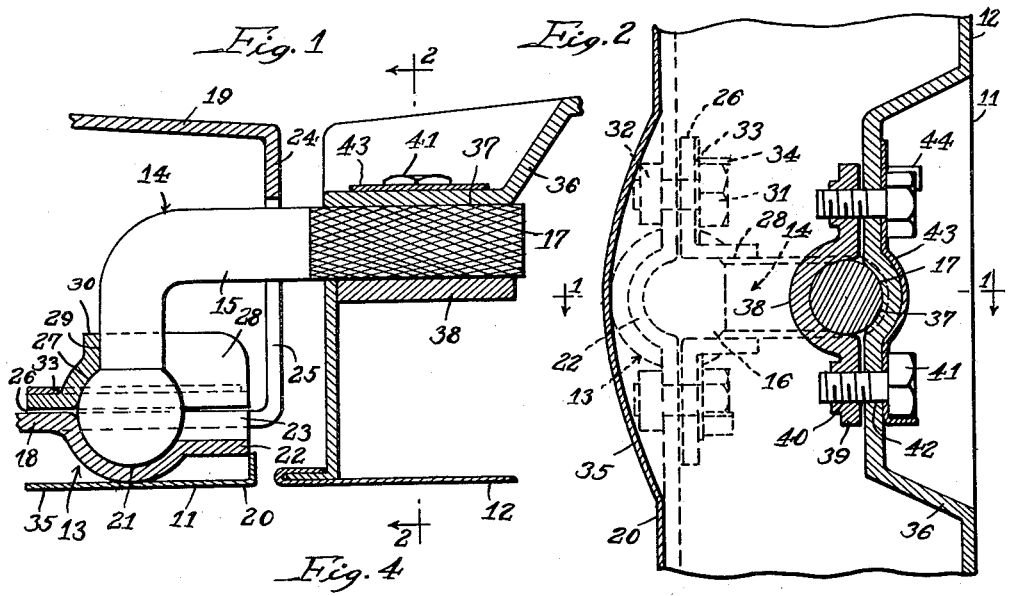
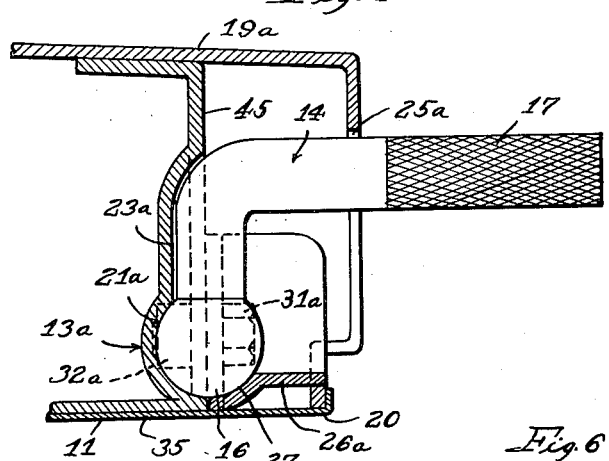
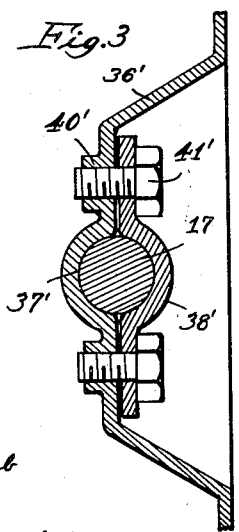
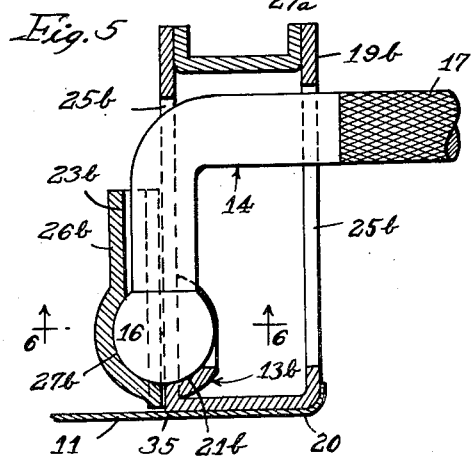
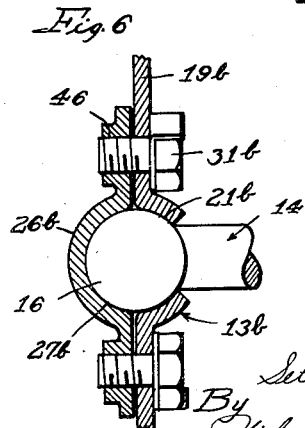
Inventor:
Seth B. Atwood
By Wilson, Dowell,
Manna + Hintercao
Attys.

May 14, 1940.　　　　S. B. ATWOOD　　　　2,200,252
HINGE
Filed July 30, 1937　　　2 Sheets-Sheet 2
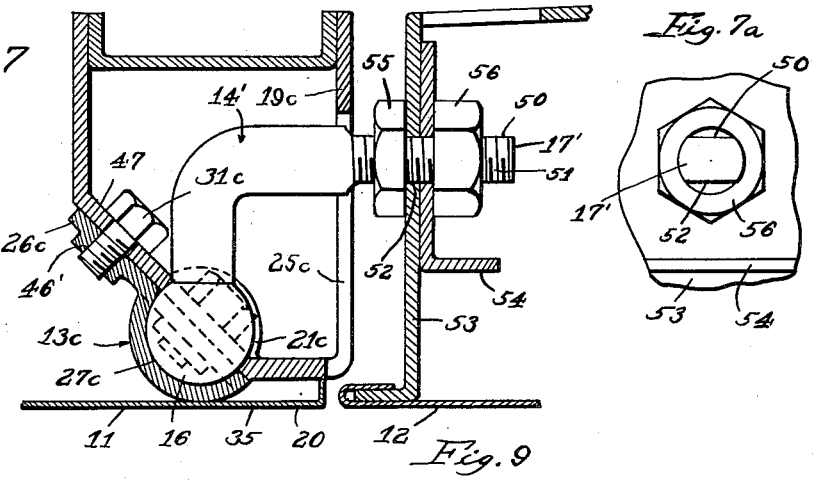
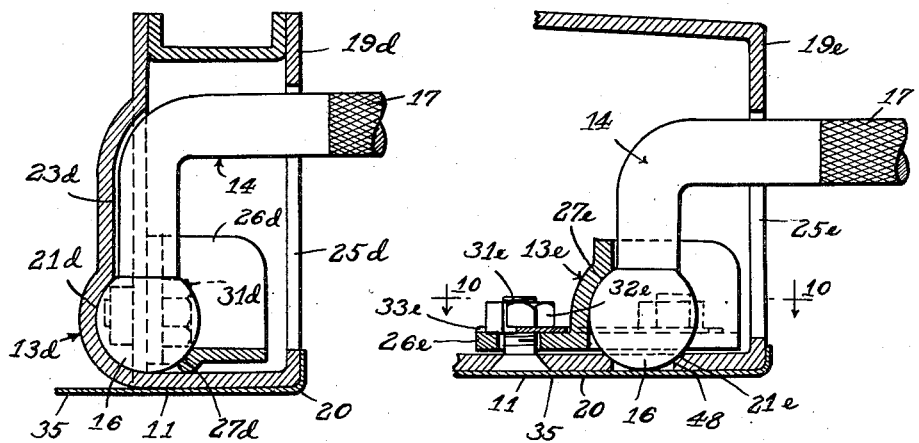
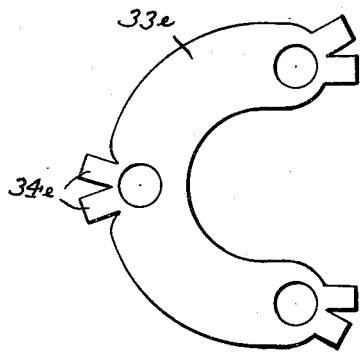
Inventor:
Seth B. Atwood
By
Wilson, Powell, M'Canna & Winterrown
Attys.

Patented May 14, 1940

2,200,252

UNITED STATES PATENT OFFICE 2,200,252

HINGE

Seth B. Atwood, Rockford, Ill.

Application July 30, 1937, Serial No. 156,509

15 Claims. (Cl. 296—44)

This invention relates to a new and improved concealed hinge for the doors of motor vehicles, and is more particularly concerned with improvements in the ball and socket type concealed hinges disclosed in the copending applications of Harold E. Van Voorhees, Serial Nos. 128,356 and 142,096, filed March 1, 1937, and May 12, 1937, respectively.

One of the principal objects of my invention is to provide a hinge of the kind mentioned of simpler and more economical construction and one which at the same time is stronger and more rigid, as well as easy to install.

In the carrying out of this object, I aim to provide portions of the socket for the ball head and the recess for the gooseneck shank as integrally formed parts of, or reenforcements in, the door pillar and door frame, respectively, at the same time arranging the parts so that the companion socket part to retain the ball head and the clamp part to fasten the gooseneck shank have their fastening bolts easily accessible for tightening.

Another object is to provide a ball and socket hinge construction wherein the socket parts and clamp parts are arranged to be resiliently drawn together by the tightening of bolts so that the ball head has a close working fit in the socket and so that the gooseneck shank is clamped tightly, the bolts or nuts in both instances having locking plates in conjunction therewith with lugs bendable into and out of holding position to permit locking the parts in adjusted condition and subsequently unlocking, retightening and relocking the bolts.

These and other objects of the invention will appear in the course of the following detailed description in which reference is made to the accompanying drawings, wherein—

Figure 1 is a horizontal section through a portion of a door pillar and door, showing a concealed ball-and-socket type hinge made in accordance with my invention, this section being on the line 1—1 of Fig. 2;

Fig. 2 is a vertical section on the line 2—2 of Fig. 1;

Fig. 3 is a sectional detail corresponding to a portion of Fig. 2, but showing a modified or alternative construction;

Figs. 4 and 5 are other horizontal sections similar to Fig. 1, but showing other constructions;

Fig. 6 is a sectional detail on the line 6—6 of Fig. 5;

Figs. 7, 8, and 9 are still further horizontal sections similar to Fig. 1, showing other constructions;

Fig. 7a is an elevational detail of a portion of Fig. 7, and

Fig. 10 is a sectional detail on the line 10—10 of Fig. 9, showing the locking plate, which is similar to the locking plates appearing in Figs. 1 and 2.

Similar reference numerals are applied to corresponding parts throughout the views.

Referring at first to Figs. 1 and 2, 11 designates the body pillar and 12 the door frame or door, but it will soon be evident that it is immaterial whether the socket member 13 and gooseneck member 14 of my improved ball-and-socket hinge are on the pillar and door, respectively, or vice versa. The gooseneck member 14 is preferably formed in one piece to provide a generally L-shaped shank 15 terminating in a ball head 16 formed as an integral enlargement of one end thereof. The other end 17 is cylindrical and knurled in accordance with the disclosure in my copending application Serial No. 135,068, filed April 5, 1937, to facilitate clamping this shank portion of the gooseneck member to the door. In keeping with the spirit of my present invention, the pillar 11 has the outer wall 18 of its sheet metal inner member 19 formed between dies to provide part of the socket 13. Thus a portion of this wall 18 is struck outwardly toward the sheet metal covering 20 to provide a substantially semi-spherical recess or depression 21 on the inside thereof. Another portion 22 of the outer wall 18 is struck outwardly to provide a half round channel or depression 23 extending radially from the center of the depression 21 and substantially at right angles to the side wall 24 of the pillar member 19, in registration with a horizontal slot 25 provided therein to afford working clearance for the gooseneck member 14. A stamped sheet metal plate 26 forms the other half of the socket 13 and has a spheroidal depression 27 to register with the semi-spherical depression 21, as well as a slot 28 in register with the half round depression 23. The inner side of the spheroidal depression 27 has a half round opening 29 defined by an outwardly bent flange 30 which is coextensive with the side walls of the slot 28, previously mentioned. Bolts 31 entered through registering holes in the plate 26 and wall 18 and threaded in nuts 32 welded or otherwise suitably secured to the outside of the wall 18 serve to clamp the plate 26 in place so as to retain the ball head 16 securely in the socket 13, while, however, allowing movement of the gooseneck member 14 through approximately 90° from the position shown in Fig. 1. A locking plate 33 with bendable lugs 34 thereon has holes therein to register with the bolt holes in the plate 26 and wall 18, and, when the bolts 31 are tightened, certain of these lugs 34 are bent outwardly alongside the bolt heads to lock the bolts in adjusted position. The plate 26, it should be noticed, is spaced from the wall 18 although fastened thereto by the bolts 31. That permits varying the frictional resistance to turning of the ball head 16 in the socket 13. The socket halves which are ordinary sheet metal stampings soon are worked to a nice fit on the ball head under the pressure and thereafter there is very little wear. The inherent resilience of the sheet metal is enough to maintain a good working fit after the parts have worn to the desired fit, so that no play and consequent rattling develops. The hinge works smoothly, freely, and quietly. It is to be noticed that the thin sheet metal covering wall 20 has a slight outward bulge 35 to cover the socket 13 and nuts 32. A corresponding bulge will be provided on the outside of the door to match, and these bulges may either taper off to merge with the outside of the body or may be continued around the body to form a sort of ornamental beading, depending, of course, upon the design and what gives the best appearance in a given case. The point is that by locating the socket 13 with its center almost in the same plane as the outside of the body, the hinges have ample throw so that the door has adequate clearance between the inner edge thereof and the outside of the body in opening and closing.

In further accordance with the spirit of the present invention, the door 12 has a sheet metal member 36 therein formed to provide a recess 37 in which to anchor the knurled shank 17 of the gooseneck member 14. A U-shaped clamp 38 surrounds the rest of the knurled shank and has outwardly bent ends 39 which are pierced, swedged and tapped, as at 40, to receive bolts 41 entered through holes 42 in the member 36 next to the clamping recess 37, whereby to force the parts together and clamp the shank 17 securely therebetween. The locking plate 43 with its bendable lugs 44 is interposed under the heads of the bolts 41 similarly as the plate 33 is inserted under the heads of the bolts 31, and the lugs 44 when bent outwardly against the heads of the bolts 41 serve to lock the same securely in adjusted position.

Fig. 3 shows a somewhat similar construction wherein the sheet metal member 36' is formed with the depression 37' on its outer side instead of its inner side and with holes 40' pierced, swedged, and tapped to take the bolts 41' provided in connection with the clamp 38'.

It should be clear from the above description that I have provided a concealed ball-and-socket hinge for the doors of motor vehicles of extremely practical and commercially feasible design and construction, inasmuch as it can be produced at a low enough cost to be competitive with the old style pintle hinges and its design is such that it lends itself for easy assembling on the doors and pillars of motor cars as now constructed. The members 19 and 36, or 36', will have the walls thereof formed as above described, and the cooperating socket part and clamp part will be furnished by the hinge manufacturer along with the gooseneck member for assembly on the car in the assembly line. Obviously since so much of the hinge structure can be formed directly in the body pillar and door frame, an appreciable saving in cost will be realized, and in addition there is greater assurance of close uniformity in quantity production and also much greater assurance of strength and rigidity in the hinges, inasmuch as the door load is assumed mainly by integral portions on the body pillar and door frame, instead of on members riveted or otherwise suitably secured thereto. With such a construction it follows, too, that less time should be consumed in centering and lining up the doors with one another and with the body, because the chances of "run out" are considerably reduced by integrally forming portions of the hinge structure on the body and doors. That is to say, since the socket depression 21 in the pillar and the gooseneck shank depression 37 in the door are provided by integrally formed portions on the body and door at the same elevations, the hinges are thereby accurately located with both the body and door, and it should not require much adjustment of the door in the opening in the body to get it properly centered and lined up. Two hinges of the kind described will be provided on each door in vertically spaced relation, it being obvious that the two points thus fixed by the balls and sockets are sufficient to determine the hinge axis of the door and provide for smooth and uniform operation throughout the range of opening movement. Hinges of the present construction will not bind nor develop play and give rise to door rattling like the old style pintle hinges. The bolts 31 will be adjusted at the factory so as to allow for fairly easy operation of the door, and then later when the car has been in service for some time, if the hinges should show signs of wear, the bolts 31 can be taken up and locked again in their new adjustment after which it is unlikely that they will ever require further attention throughout the life of the car. Ordinarily the bolts 31 will not require attention after the car has left the factory, but there again if the door sags, or for any reason requires re-alignment, the bolts 31 can be loosened to permit re-alignment and then tightened again and locked to keep them in adjusted condition.

Fig. 4 shows a sheet metal pillar member 19a with a transverse sheet metal reenforcement 45 welded or otherwise suitably secured therein formed between dies to provide part of the socket 13a. The gooseneck member 14 projects through the slot 25a in the pillar member and has the ball head 16 fitting in the depression 21a formed in the reenforcement 45, while the adjacent end of the shank is received in a channel 23a formed in the reenforcement next to the socket depression. The plate 26a is similar to the plate 26, previously described, having a spheroidal-shaped portion 27a to engage the ball head from the opposite side and retain it in the socket 13a when the plate 26a is fastened in place as by bolts 31a entered through the plate 26a and reenforcement 45 and threaded in nuts 32a. The knurled end 17 of the gooseneck shank can be fastened to the door as in Figs. 2 or 3, or in any other suitable or preferred manner. The operation and advantages of this hinge are substantially the same as with the hinge previously described.

Figs. 5 and 6 show still another construction in which the sheet metal pillar member 19b is channel-shaped in cross-section and has slots 25b in both walls through which the gooseneck member 14 extends, the inner wall of the member 19b being formed as shown at 21b to provide part of the socket 13b for the ball head 16. In this construction, a plate 26b has a substantially semi-spherical depression 27b formed therein to engage the ball head 16 from the opposite side to retain it in place in the socket 13b when the bolts 31b passed through holes in the inner wall of the member 19b and threaded in the holes 46 in the plate 26b are tightened. A channel 23b is formed in the plate 26b extending from the socket depression 27b to accommodate the adjacent end of the shank of the gooseneck 14. The other end 17 of the shank is knurled, as indicated, and is adapted to be fastened to the door in any suitable or preferred manner. The operation and advantages of this hinge are similar to those mentioned in regard to the other hinges.

Fig. 7 shows another substantially channel-shaped sheet metal pillar member 19c slotted, as at 25c, for reception of the gooseneck member 14'. The inclined wall 47 on one side of the pillar member 19c is perforated and struck inwardly to provide a portion of the socket 13c for the ball head 16, as indicated at 21c. A plate 26c fastened in place by bolts 31c which thread in holes 46' in the plate 26c has a semi-spherical socket depression 27c therein to retain the ball head 16. The shank 17' in this case is machined flat on opposite sides, as at 50, and is threaded, as indicated at 51, so that when the shank is slipped through the oblong holes 52 provided therefor in the wall 53 of the door frame and the inner reenforcing member 54 suitably welded thereto, nuts 55 and 56 threaded on the shank and tightened against the door frame from the outside and inside will serve to anchor the gooseneck member 14' securely and make it perfectly rigid with the door. The construction obviously permits in and out adjustment of the shank 17' relative to the door frame, as required in centering the door in the opening, and the gooseneck member cannot turn in its opening in the frame, so that there is no danger of the door sagging. The reenforcing member 54 may or may not be necessary. It is obvious that with this construction the same general advantages are obtained as with the other constructions and the operation is similar.

Fig. 8 shows a construction resembling both Figs. 4 and 5, and particularly Fig. 5. The sheet metal pillar member 19d is substantially channel-shaped in cross-section and slotted on one side, as at 25d, to receive the gooseneck member 14. The other side of the channel-shaped pillar member 19d is formed to provide part of the socket 13d for the ball head 16, there being a spheroidal depression 21d formed therein to receive the ball head, and a channel 23d extending from the socket depression to accommodate the adjacent portion of the shank of the gooseneck member 14. The plate 26d arranged to be bolted to the inside of the channel member 19d, as indicated at 31d, has a spheroidal shaped socket depression 27d to retain the ball head 16 in the socket 13d. Here again it is believed to be apparent that the same general advantages are obtained with this construction as with the others previously described, and the operation is similar.

Fig. 9 shows a sheet metal pillar member 19e of channel-shaped cross-section with a slot 25e in the transverse wall thereof to receive the gooseneck member 14 and with a hole 48 in the outer wall under the sheet metal sheathing 20 to locate the ball head 16, the hole 48 being suitably counterbored or chamfered, as at 21e, to provide a broader annular seat for the ball head and part of the socket 13e. The plate 26e which is fastened by the bolts 31e and nuts 32e to the inside of the pillar member 19e has a spheroidal-shaped depression 27e to engage the ball head 16 from the opposite side and retain it in the hole 48. The plate 33e shown under the nuts 32e has locking lugs 34e thereon bendable outwardly into engagement with the sides of the nuts to lock them in adjusted position, whereby to afford the advantages previously mentioned in connection with the description of the locking plate 33 shown in Figs. 1 and 2. The same general advantages are obtained with this construction as with the others, and the operation is similar.

It is believed the foregoing description conveys a good understanding of the objects and advantages of my invention. The appended claims have been drawn with a view to covering all legitimate modifications and adaptations.

I claim:

1. In metal door frame construction, the combination of a sheet metal frame member formed to provide a vertical side wall adjacent the hinged edge of a door and a vertical front wall substantially at right angles thereto, the side wall having an elongated opening provided therein to afford working clearance for a concealed door hinge member, means integral with the front wall formed by metal displaced outwardly from said wall to provide a ball socket inside said frame member spaced laterally from the side wall and in substantially the same horizontal plane with said opening, and an angular, ball-ended, door-supporting hinge member extending into said frame member through the opening in the side wall thereof and having an attaching portion attached to the door and a transverse end portion carrying the ball on the end thereof swivelled and retained in said socket, said attaching and end portions being disposed in substantially parallel spaced relation to the front and side walls, respectively, of the frame member in the closed position of the door.

2. In metal door frame construction, the combination of a sheet metal frame member formed to provide a vertical side wall adjacent the hinged edge of a door and a vertical front wall substantially at right angles thereto, the side wall having an elongated opening provided therein to afford working clearance for a concealed door hinge member, means integral with the front wall formed by metal displaced outwardly from said wall to provide a ball socket inside said frame member spaced laterally from the side will and in substantially the same horizontal plane with said opening and a clearance channel also inside said frame member extending from said socket to said slot in said side wall, and an angular, ball-ended, door-supporting hinge member extending into said frame member through the opening in the side wall thereof and having an attaching portion attached to the door and a transverse end portion carrying the ball on the end thereof swivelled and retained in said socket, said attaching and end portions being disposed in substantially parallel spaced relation to the front and side walls, respectively, of the frame member in the closed position of the door, said end portion being adapted to enter said channel when the hinge door is swung open to a limit position relative to the frame member.

3. In metal door frame construction, the combination of a sheet metal frame member formed to provide vertical inner and outer side walls and a connecting front wall substantially at right angles thereto, the outer side wall having an elongated opening provided therein to afford working clearance for a concealed door hinge member, means integral with the inner side wall formed by metal displaced therefrom to provide a ball socket on said frame member, an angular ball-ended, door-supporting hinge member extending into said frame member through said opening in said outer side wall and having an attaching portion attached to the door and a transverse end portion carrying the ball on the end thereof swivelled in said socket, and means for retaining the ball against displacement from the socket, said attaching and end portions being disposed in substantially parallel spaced relation to the front and outer side walls, respectively, of the frame member in the closed position of the door.

4. In metal door frame construction, the combination of a sheet metal frame member formed to provide a vertical side wall adjacent the hinged edge of a door and a vertical front wall substantially at right angles thereto, the side wall having an elongated opening provided therein to afford working clearance for a concealed door hinge member, the front wall having an opening provided therein, means integral with the front wall formed by metal displaced from said wall adjacent the opening to provide a ball socket on said frame member, an angular, ball-ended, door-supporting hinge member extending from said frame member through the opening in the side wall thereof and having an attaching portion attached to the door and a transverse end portion carrying the ball on the end thereof swivelled in said socket, said attaching and end portions being disposed in substantially parallel spaced relation to the front and side walls, respectively, of the frame member in the closed position of the door, and means engaging the front wall from the outside of the frame member to retain the ball in said socket.

5. In metal door frame construction, the combination of a sheet metal frame member formed to provide angularly related substantially vertical walls, one of said walls being adjacent the hinged edge of a door and having an elongated opening provided therein to afford working clearance for a concealed door hinge member, means integral with another of said vertical walls formed by metal displaced therefrom to provide a ball socket on said frame member, and an angular, ball-ended, door-supporting hinge member extending from said frame member through said opening and having an attaching portion attached to the door and a transverse end portion carrying the ball on the end thereof swivelled and retained in said socket, said attaching and end portions being disposed in substantially parallel spaced relation to the walls of said frame member in the closed position of the door.

6. In an automobile construction, the combination of a body provided with a door opening, a door for said opening and a concealed hinge for said door secured to the door and body, the body comprising a sheet metal pillar member and the door comprising a sheet metal frame member, said members having depressions formed in the sheet metal thereof in horizontal alignment, and said hinge comprising interfitting ball and socket members, the ball member being L-shaped to provide on one portion an attaching shank fitting in the depression in one of said pillar and frame members and arranged to be clamped therein, means for clamping said shank immovably in said depression, the other portion of said ball member being in transverse relation to the clamped portion and carrying a ball on the extremity thereof adapted to fit in the other of said depressions, and the socket member registering with said other depression in the other of said pillar and frame members to complete a socket wherein the ball end of the ball member is received for swivel movement, and means for securing said socket member in place so as to permit swivel movement of the ball and of the ball member in said depression.

7. In an automobile construction, the combination of a body provided with a door opening, a door for said opening and a concealed hinge for said door secured to the door and body, the body comprising a sheet metal pillar member and the door comprising a sheet metal frame member, one of said members having a spheroidal depression formed in the sheet metal thereof and the other member having an elongated channel-shaped depression formed in the sheet metal thereof substantially in horizontal alignment with the aforesaid depression, said hinge comprising a ball headed L-shaped member having an elongated attaching shank portion adapted to fit in said channel-shaped depression and a transverse end portion carrying the ball head adapted to fit in the spheroidal depression, and retaining and clamping plates cooperating with the ball end and attaching end of said ball head member to retain the ball head in the spheroidal depression with freedom for swivel movement and to clamp the attaching end in the channel depression.

8. In combination, a vehicle body portion, a door portion, and hinges for said door each comprising a ball headed member having an attaching shank for securing the same to one of said body and door portions and a socket for swivel reception of the ball head comprising superimposed socket plate portions, one of which is rigid with the other of said body and door portions, and threaded bolts for securing the two plate portions together to confine the ball head therebetween, said plate portions being in spaced relation and the bolts being arranged to be tightened to draw the plate portions together more or less tightly to allow more or less free swivel movement of the ball head therebetween.

9. In combination, a vehicle body portion, a door portion, and hinges for said door each comprising a ball headed member having an attaching shank for securing the same to one of said body and door portions and a socket for swivel reception of the ball head comprising superimposed socket plate portions, one of which is rigid with the other of said body and door portions, threaded bolts for securing the two plate portions together to confine the ball head therebetween, said plate portions being in spaced relation and the bolts being arranged to be tightened to draw the plate portions together more or less tightly to allow more or less free swivel movement of the ball head therebetween, and means for locking the bolts in adjusted position.

10. In an automobile construction, comprising a body having a door opening and a door for closing said opening, a concealed ball-and-socket hinge comprising a socket member on the body and an angular gooseneck member comprising an attaching shank portion and a transverse end portion terminating in a ball head in laterally spaced relation to the attaching shank portion swivelled in the socket of the socket member, and means for adjustably securing the attaching shank portion of said gooseneck member to the door to permit endwise adjustment thereof while preventing rotation so as to keep the ball head in the same horizontal plane with said attaching shank portion, said attaching shank portion being cylindrical and being threaded but being machined flat at least on one side thereof, said means comprising an opening provided in the wall of the door conformed to receive said threaded attaching shank portion slidably but non-rotatably so as to permit in and out adjustment of said attaching shank portion relative to the door, and nuts threaded on said attaching shank portion and tightened against the inside and outside of the aforesaid wall, whereby to secure the gooseneck member in rigid adjusted relation to the door.

11. A structure as set forth in claim 10, wherein the attaching means includes a reenforcing member secured to the inside of the wall of said door and having a similarly conformed opening provided therein registering with the opening in said wall through which the attaching shank portion projects and against the inner side of which the nut on the inside of the door is arranged to be tightened, whereby to provide for increased length of bearing for the attaching shank portion in the door and increased strength and stiffness in the wall at the point of attachment of the attacking shank portion to the door.

12. In an automobile construction, comprising a body having a door opening and a door for closing said opening, a concealed ball-and-socket hinge comprising a socket member on the body and an angular gooseneck member terminating in a ball head in laterally spaced relation to the attaching shank portion swivelled in the socket of the socket member, and means for adjustably securing the attaching shank portion of said gooseneck member to the door to permit endwise adjustment thereof, said attaching shank portion being cylindrical and being threaded, said means comprising an opening provided in the wall of the door to receive said threaded attaching shank portion slidably so as to permit in and out adjustment of said attaching shank portion relative to the door, and nuts threaded on said attaching shank portion and tightened against the inside and outside of the aforesaid wall, whereby to secure the gooseneck member in rigid adjusted relation to the door, and means holding the angular gooseneck member against turning when in adjusted position to prevent sagging of the door.

13. A structure as set forth in claim 12, wherein the attaching means includes a reenforcing member secured to the inside of the wall of said door and having a similar opening provided therein registering with the opening in said wall through which the attaching shank portion projects and against the inner side of which the nut on the inside of the door is arranged to be tightened, whereby to provide for increased length of bearing for the attaching shank portion in the door and increased strength and stiffness in the wall at the point of attachment of the attaching shank portion to the door.

14. In combination, a vehicle body portion, a door portion, and hinges for said door each comprising a ball headed member having an attaching shank for securing the same to one of said door and body portions, and a socket for swivel reception of the ball head comprising sheet metal socket plate portions, one of which is rigid with the other of said door and body portions, and threaded means for securing the plate portions together to confine the ball head therebetween, the threaded means passing through openings provided in said plate portions in radially spaced relation to the socket and said plate portions being in spaced relation when confining the ball head therebetween, said bolts being adapted to be tightened to draw the plate portions together more or less tightly to allow more or less free swivel movement of the ball head therebetween, the plate portions being flexible toward one another in the tightening of the bolts whereby the socket portions thereof are resiliently urged toward one another.

15. In combination, a vehicle body portion, a door portion, and hinges for said door each comprising a ball headed member having an attaching shank for securing the same to one of said door and body portions, and a socket for swivel reception of the ball head comprising sheet metal socket plate portions, one of which is rigid with the other of said door and body portions, threaded means for securing the plate portions together to confine the ball head therebetween, the threaded means passing through openings provided in said plate portions in radially spaced relation to the socket and said plate portions being in spaced relation when confining the ball head therebetween, said bolts being adapted to be tightened to draw the plate portions together more or less tightly to allow more or less free swivel movement of the ball head therebetween, the plate portions being flexible toward one another in the tightening of the bolts whereby the socket portions thereof are resiliently urged toward one another, and means for locking said threaded means in adjusted position.

SETH B. ATWOOD.

CERTIFICATE OF CORRECTION.

Patent No. 2,200,252.  May 14, 1940.

SETH B. ATWOOD.

It is hereby certified that error appears in the printed specification of the above numbered patent requiring correction as follows: Page 3, second column, line 72, claim 2, strike out the word "hinge"; page 5, first column, line 36, claim 11, for "attacking" read --attaching--; line 42, claim 12, after "member" insert --comprising an attaching shank portion and a transverse end portion--; and that the said Letters Patent should be read with this correction therein that the same may conform to the record of the case in the Patent Office.

Signed and sealed this 23rd day of July, A. D. 1940.

Henry Van Arsdale,
(Seal) Acting Commissioner of Patents.